J. W. HARTLEY.
SPRING DRAFT ATTACHMENT.
APPLICATION FILED APR. 15, 1912.
1,084,699.
Patented Jan. 20, 1914.
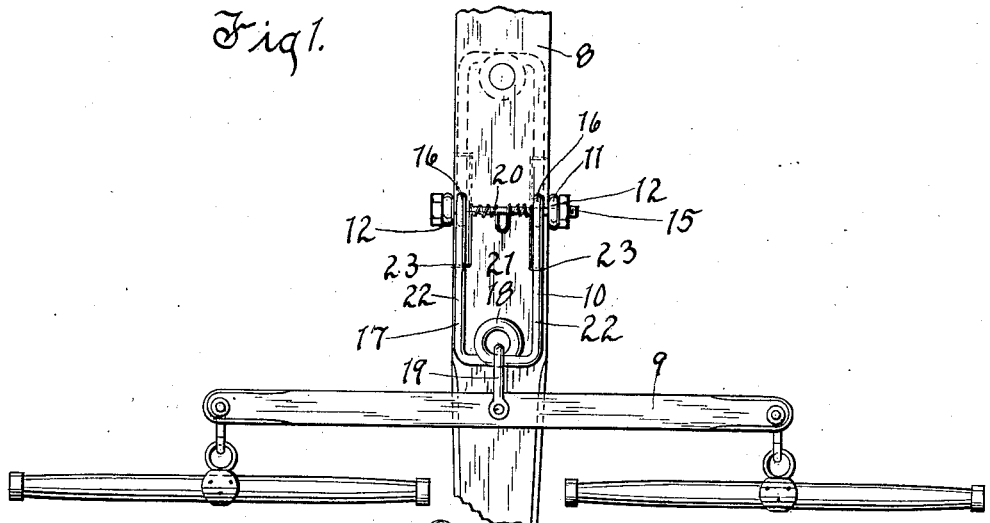
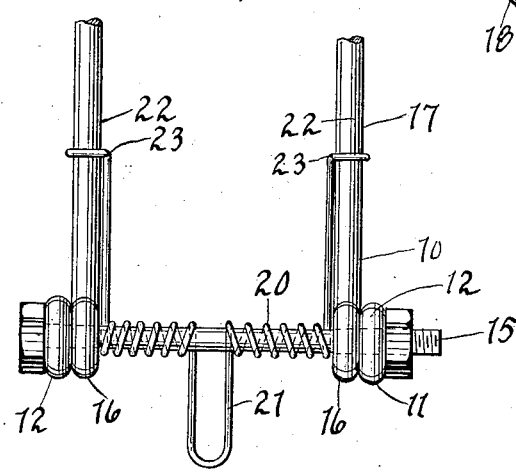
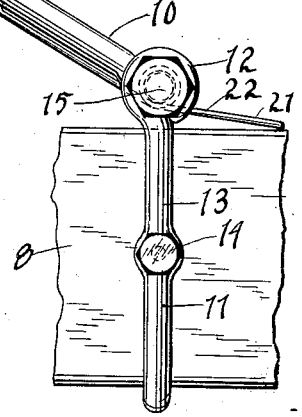
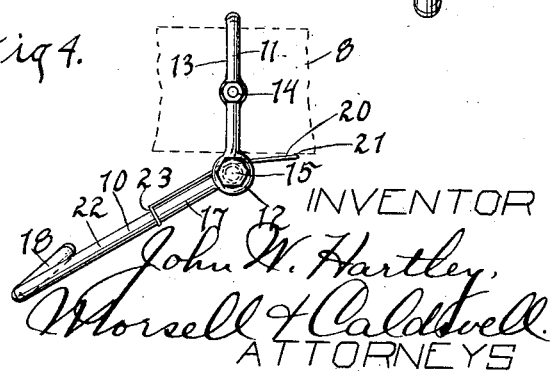
WITNESSES
Arthur F Miller.
Katherine Holt
INVENTOR
John W. Hartley,
By Morsell & Caldwell
ATTORNEYS
COLUMBIA PLANOGRAPH CO., WASHINGTON, D. C.

UNITED STATES PATENT OFFICE.

JOHN W. HARTLEY, OF NASHOTAH, WISCONSIN.

SPRING DRAFT ATTACHMENT.

1,084,699. Specification of Letters Patent. Patented Jan. 20, 1914.

Application filed April 15, 1912. Serial No. 690,752.

*To all whom it may concern:*

Be it known that I, JOHN W. HARTLEY, a citizen of the United States, and resident of Nashotah, in the county of Waukesha and State of Wisconsin, have invented new and useful Improvements in Spring Draft Attachments, of which the following is a description, reference being had to the accompanying drawings, which are a part of this specification.

This invention relates to improvements in spring draft attachments for connecting doubletrees to the poles of wagons or other vehicles.

It is one of the objects of this invention to provide a spring draft attachment to yieldingly connect the doubletree to the pole of a wagon to relieve the shoulders of the draft animal from blow or concussion in starting the load and also when the wagon strikes an obstruction.

A further object of the invention is to provide a spring attachment for yieldingly connecting the doubletree to the pole of a wagon which is adapted to swing the doubletree to a position away from the pole and free from engagement with the hind legs of the draft animal when backing up or when the doubletree is not under draft tension.

With the above and other objects in view, the invention consists of the improved spring draft attachment and its parts and combinations, as set forth in the claims, and all equivalents thereof.

In the accompanying drawing in which the same reference characters indicate the same parts in all of the views: Figure 1 is a top view of a portion of a wagon pole and the doubletree thereof provided with the improved spring draft attachment connected thereto and with the doubletree in forward position; Fig. 2 is a side view, on a larger scale, of the spring draft attachment and a portion of the pole, the attachment being swung to a rearward position; Fig. 3 is a similar top view of a portion of the attachment; and Fig. 4 is a side view of the attachment shown attached to the under side of the pole, the pole being shown in dotted lines.

Referring to the drawing the numeral 8 indicates the pole of a wagon and 9 the doubletree connected thereto by the improved spring draft attachment 10. The attachment comprises a U-shaped pole member 11 having eyes 12 provided at the upper ends of the stems 13 thereof. The pole member is adapted to extend around the pole of the wagon and to be secured thereto by a bolt 14 which passes through bolt openings provided in the medial portions of the stems and the pole. The eyed portions of the pole member extend above the upper surface of the pole and a bolt 15, extending transversely across the pole and through the eyes, also passes through the eyed ends 16 of a swing member 17 and pivotally connects said member to the pole. The swing member 17 is also of U-shape and is bent medially to form an eye 18 to which the doubletree is attached by means of the loop 19. A coiled spring 20, having a medial tongue 21, is wound around the bolt 15 and the outer ends of the spring extend alongside of the arms 22 of the swing member 17 and are bent to form hooks 23 which extend around said arms. The medial loop 21 of the spring bears against the pole and serves to hold the spring under tension and to normally swing the member 17 and the doubletree attached thereto upwardly and toward the rear end of the pole.

In the modified form shown in Fig. 4 the attachment is placed beneath the pole and attached thereto in substantially the same manner except that the parts are upside down.

In use the parts are attached in the manner shown and when a pull is exerted on the doubletree the load will be easily started and in pulling the load the doubletree will be swung to forward position and will be under constant tension so that the animal will be relieved of sudden jolts, due to striking obstructions, and if the draft animals are backed up the doubletree will be swung upwardly and rearwardly away from the legs of the animals.

From the foregoing description it will be seen that the spring draft attachment is of very simple construction and is well adapted for the purpose desired.

What I claim as my invention is:

1. A spring draft attachment, comprising a U-shaped swing member adapted to be pivoted to the opposite side portions of a wagon pole and to have a doubletree attached thereto, and a yielding means connected to the swing member for swinging said member in a direction opposite to the draft of the doubletree.

2. A spring draft attachment, comprising a U-shaped pole member adapted to be attached to the opposite side portions of the pole of a wagon, a U-shaped swing member having its end portions pivoted to the pole member and adapted to have a doubletree attached to a medial portion of the said swing member, and a spring for swinging the swing member in a direction opposite to the draft of the doubletree.

3. A spring draft attachment, comprising a pole member adapted to be attached to the pole of a wagon, a swing member pivoted to the pole member and adapted to have a doubletree attached thereto, and a coiled spring carried by the pole member and having a medial portion which engages the pole and outer end portions which engage the swing member to swing said member in a direction opposite to the draft of the doubletree.

4. A spring draft attachment, comprising a pole member adapted to be attached to the pole of a wagon, a swing member positioned adjacent to the pole member and adapted to have a doubletree attached thereto, a bolt pivoting the swing member to the pole member, a coiled spring surrounding the bolt and having one portion engaging the pole and another portion engaging the swing member to swing said member in a direction opposite to the draft of the doubletree.

5. A spring draft attachment, comprising a U-shaped pole member having eyes provided in its ends and adapted to be attached to the pole of a wagon, a U-shaped swing member positioned adjacent to the pole member and having eyes provided on its ends which register with the eyes of the pole member, a bolt extending through the eyes to pivot the two members together, and a coiled spring surrounding the bolt and having a medial tongue which engages the pole and with outer hooked ends which engage the swing member to swing said member in a direction opposite to the draft of the doubletree.

6. A spring draft attachment, comprising a U-shaped yielding swing member adapted to be pivoted to the opposite side portions of a wagon pole and to have a doubletree attached to a medial portion of the said swing member, said swing member adapted to swing the doubletree in a vertical plane in a direction opposite to the draft of the doubletree.

In testimony whereof, I affix my signature, in presence of two witnesses.

JOHN W. HARTLEY.

Witnesses:
C. H. KEENEY,
KATHERINE HOLT.

---

Copies of this patent may be obtained for five cents each, by addressing the "Commissioner of Patents, Washington, D. C."